(12) United States Patent
Isalberti et al.

(10) Patent No.: US 7,765,833 B2
(45) Date of Patent: Aug. 3, 2010

(54) APPARATUS FOR ADJUSTABLE STACKER BAR ASSEMBLY HAVING QUICK CHANGE FEATURES

(75) Inventors: Giuseppe Isalberti, Milan (IT); Elmer Christian Pennewaard, Holten (NL); Thomas Warren Uhl, Denton, TX (US)

(73) Assignee: Poco Graphite, Inc., Decatur, TX (US)

( * ) Notice: Subject to any disclaimer, the term of this patent is extended or adjusted under 35 U.S.C. 154(b) by 783 days.

(21) Appl. No.: 11/384,713

(22) Filed: Mar. 20, 2006

(65) Prior Publication Data

US 2007/0214837 A1    Sep. 20, 2007

(51) Int. Cl.
*C03B 9/04* (2006.01)
*C03B 9/00* (2006.01)

(52) U.S. Cl. .......................................... 65/260; 65/243

(58) Field of Classification Search ................... 65/260, 65/165, 171, 172, 227, 229, 239, 241, 261, 65/323, 375; 198/430–433; 414/744.1, 744.2, 414/751
See application file for complete search history.

(56) References Cited

U.S. PATENT DOCUMENTS

| | | | |
|---|---|---|---|
| 4,411,353 A | 10/1983 | McDole | |
| 4,466,532 A | 8/1984 | Minneman et al. | |
| 4,801,319 A | 1/1989 | Rugaber et al. | |
| 5,044,488 A | 9/1991 | Bolin | |
| 5,092,449 A | 3/1992 | Bolin et al. | |
| 5,324,340 A | 6/1994 | Withrow et al. | |
| 5,472,077 A | 12/1995 | Bolin | |
| 5,741,343 A * | 4/1998 | Lloyd et al. | ................... 65/260 |
| 5,755,847 A | 5/1998 | Quayle | |
| 5,814,120 A | 9/1998 | Lloyd et al. | |
| 5,992,613 A | 11/1999 | DiFrank | |
| 6,044,962 A * | 4/2000 | Vaughn | ..................... 198/598 |

FOREIGN PATENT DOCUMENTS

| | | |
|---|---|---|
| DE | 198 38 844 | 3/2000 |
| WO | WO 2005/100271 | 10/2007 |

OTHER PUBLICATIONS

Stewart D R et al: "Specialization Comes to Hot Glass Handling" Glass Industry, Glass Industry Magazine. New York, US, vol. 70, No. 5, Apr. 1, 1989, pp. 20-22.

* cited by examiner

*Primary Examiner*—Steven P Griffin
*Assistant Examiner*—Jodi Cohen
(74) *Attorney, Agent, or Firm*—Patterson Thuente Christensen Pedersen, P.A.

(57) ABSTRACT

An adjustable stacker bar assembly includes a pad assembly having a lower pad that is mounted to a push bar. The lower pad is in direct contact with and independently mounted to the push bar. An upper pad is mounted to and spaced apart from the lower pad by a spacer. The spacer is free of contact with the push bar. The pads contact and push glass articles into an annealing furnace.

3 Claims, 6 Drawing Sheets

APPARATUS FOR ADJUSTABLE STACKER BAR ASSEMBLY HAVING QUICK CHANGE FEATURES

BACKGROUND OF THE INVENTION

1. Technical Field

The present invention relates in general to manufacturing glass articles and, in particular, to an improved system, method, and apparatus for an adjustable stacker bar assembly having quick change features in a hot glass article fabrication operation.

2. Description of the Related Art

To fabricate a glass article, a mass of molten glass is typically blown into a mold, partially cooled, and the resultant hot glass article transferred to an annealing oven. During transfer to the annealing oven, the hot glass articles are extremely fragile and susceptible to thermal and physical stress, contamination, and other damage. In addition, annealing or other post-forming process steps may not fully remove added stress concentrations or risers and other defects in the hot glass articles caused by the handling fixtures or transfer equipment.

Any fixtures or equipment touched by hot unannealed glass articles should be made of materials that will minimize stress concentration, contamination, deformation, cracking, or checking of the hot glass. Furthermore, the materials used to handle the hot glass articles must themselves be able to withstand the high temperature contact with the hot glass articles and be rigid enough to insure proper alignment/placement of the articles within the annealing oven.

Stainless steel and other high temperature metal alloys have been used for the body or support structure of fixtures that handle hot glass articles. However, metallic materials can cause thermal and/or physical damage if they contact hot glass articles. Therefore, various nonmetallic contact materials have typically been incorporated into fixture designs as removable inserts, pads, or spacers for contacting the hot glass articles, e.g., fabric cloth coverings capable of withstanding high temperatures) or asbestos, plastics, and graphite-containing pads attached to a steel support bar. Unfortunately, the use of these nonmetallic materials presents drawbacks to glass manufacturers.

Although asbestos may have very good thermal and physical properties for this application, its use creates grave environmental and workplace safety concerns. Plastics are generally less well suited for this high temperature application and typically have a relatively short service life even when specially formulated to withstand the high temperatures encountered in this hot end process. Graphite may be more of an ideal nonmetallic material for handling hot glass since graphite has resistance to oxidation at temperatures typically encountered when contacting hot glass articles, nonabrasive surface integrity, and acceptable heat resistance. It is also safe for the environment and to those who work with it.

However, graphite presents several problems that must be overcome before it can be economically used as a material for handling hot glass articles. One problem graphite presents is that it is relatively brittle and therefore can chip or crack or be otherwise mechanically damaged. Another problem frequently encountered with graphite is the difficulty in removably attaching a graphite contact pad to the supporting body of a fixture. Since graphite can wear during use, the graphite contact material should be readily removable. Removability can result in the attachment to the supporting structure not holding the graphite rigidly and reliably during glass production. Another problem is the need to economically provide an array of graphite contact pads in different shapes and sizes to handle different shapes and sizes of hot glass articles, e.g., the need for machinability.

One specific device for handling hot gas articles is a stacker bar assembly that typically uses nonmetallic pads. Such an assembly is typically used to transfer glassware from a narrow, single line conveyer, known as a cross conveyor, across a transfer plate to a multi-line conveyer. The stacker bar assembly may impart motion in several directions, e.g., to properly space hot glass articles in the oven as well as push the articles into the oven.

A typical stacker bar assembly is composed of a steel support tubing, and a glass contact surface, such as attached fabric or carbon-based pads. The assembly typically forms pockets for a particular shape and size of glassware. Thus, many stacker bar assemblies are required to handle the needs of a typical glassware manufacturing facility producing different shapes and sizes of glass articles.

Handling and other problems resulting from graphite's brittleness and relatively short life (when compared to high temperature metallic components), difficulties in rigidly attaching a brittle, low strength material to the steel support, and machining difficulties make graphite, composite graphite, and other carbon materials difficult to use as a contact material in stacker bar assemblies. Graphite or carbon materials can be combined with plastic resins or fibers, but resins and reinforcing fibers create new problems. The resins typically have limited thermal capability, and fiber reinforced compositions are typically not easily machinable, making fabrication of some complex shapes difficult if not impossible. Frequent removal of pads to adapt to different glass articles sizes also increases the risk of damage.

Currently, fabricators of glass articles select stacker bar assemblies based on many different variables, such as worker skill level, the number of different sizes of containers to produce, personal preference, etc. In the prior art, U.S. Pat. No. 5,741,343 discloses one type of an adjustable hot glass transfer device. This device uses repositionable stacker bar pads formed from a nonmetallic material. The pads have tongue-in-groove adjoining surfaces and glass contact surfaces that are serrated. This pads also have a rough finish to minimize thermal checking and other hot glass article problems. Although this design offers a workable solution, it can be time consuming to adjust the pads to glass articles of differing size, and/or to replace worn or damaged pads. Thus, an improved solution would be desirable.

SUMMARY OF THE INVENTION

One embodiment of a system, method, and apparatus for a stacker bar assembly is both adjustable and incorporates quick change features for the pads or inserts. The stacker bar assembly includes a pad assembly having a lower pad that is mounted to a push bar. The lower pad is in direct contact with and independently mounted to the push bar. An upper pad is mounted to the lower pad and may be spaced apart from the lower pad by a spacer. The spacer is free of contact with the push bar. The pads contact and push glass articles into an annealing furnace.

The invention uses a spring-biased design that allows broken and/or worn pads to be quickly replaced, even in front of the annealing furnace. Thus, there is no need to stop production while changing even just one pad, as is currently required by existing designs. The present invention also allows a change in height of the stacker bar glass contact surface to improve support of bottles being pushed into the annealing furnace. This design incorporates a removable metal pin that can be screwed one on top of another as well as on the spring nuts.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

The present invention incorporates a number of features found in U.S. Pat. No. 5,741,343, which is incorporated herein by reference.

Figure 1:
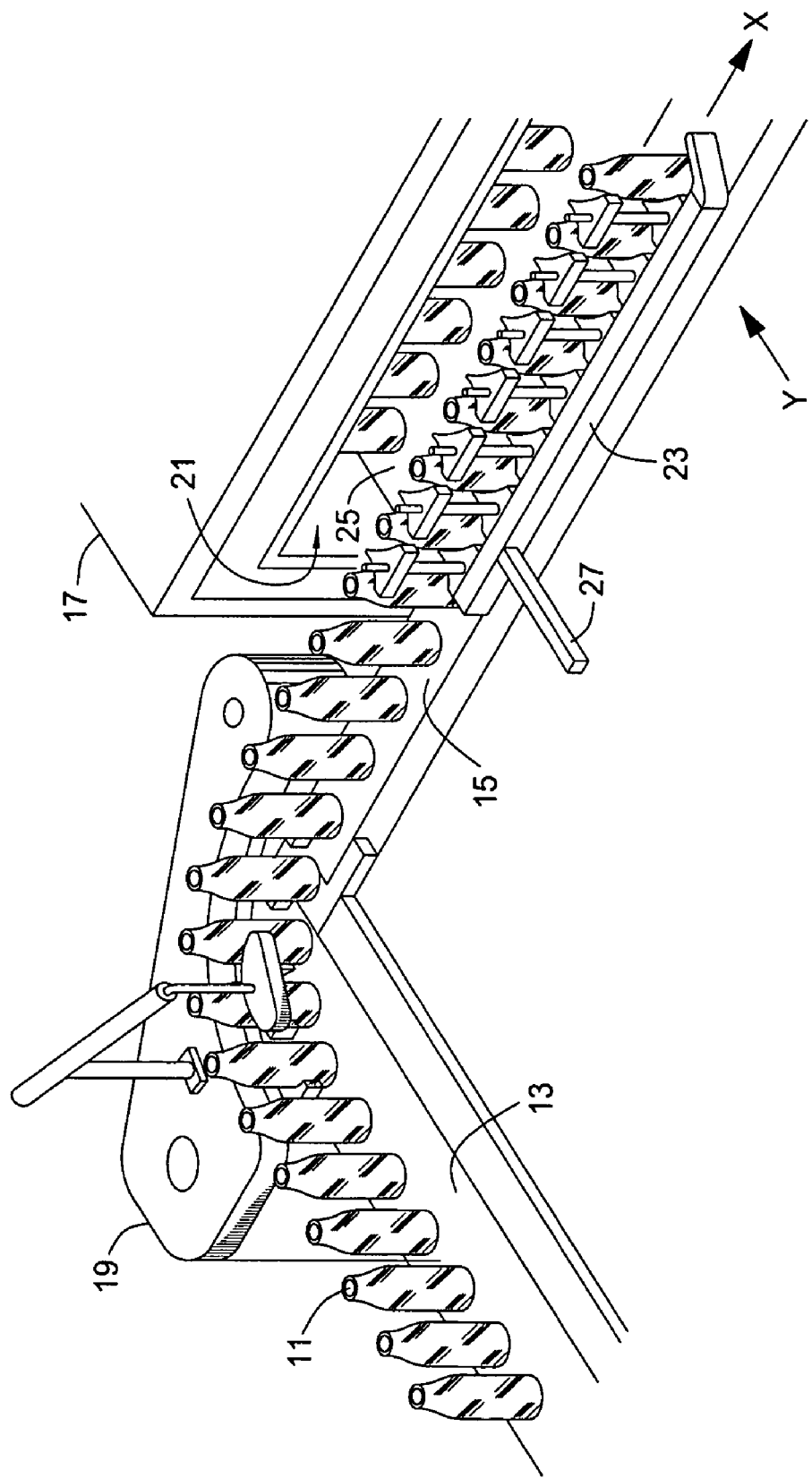
FIG. 1 is an isometric view of equipment used to fabricate glass articles and is constructed in accordance with the present invention.

Referring to FIG. 1, a hot-end equipment portion of a prior art glass article manufacturing process is shown. Molding and mold transfer equipment is not shown for clarity. Molded hot-glass articles 11, such as bottles, are transferred by a single line conveyor 13 and a cross conveyor 15 toward an annealing furnace 17 that removes stresses produced during the glass molding process. In the configuration shown, hot glass articles 11 are transferred from the single line conveyor 13 to the cross conveyor 15 by a transfer unit 19 that may change the spacing between the hot glass articles 11. Near the oven entry port 21, a stacker push bar assembly 23 pushes a plurality of the hot glass articles 11 from the cross conveyor 15 to the multi-line conveyor 25 which moves the hot glass articles 11 through the furnace 17.

Various conventional pushing mechanisms (not shown for clarity) or other means for pushing the stacker push bar assembly 23 can be used. These means can include hydraulic actuators, pneumatic cylinders, electrical actuators, magnetic actuators, and manual operators. Although a single connector portion 27 of the stacker push bar assembly 23 extending toward a pushing mechanism is shown, the stacker bar assembly may be directly pushed or actuated without a connector portion. Alternatively, multiple connector portions and/or pushing mechanisms may be used instead of the single connector portion 27 shown.

Figure 2:
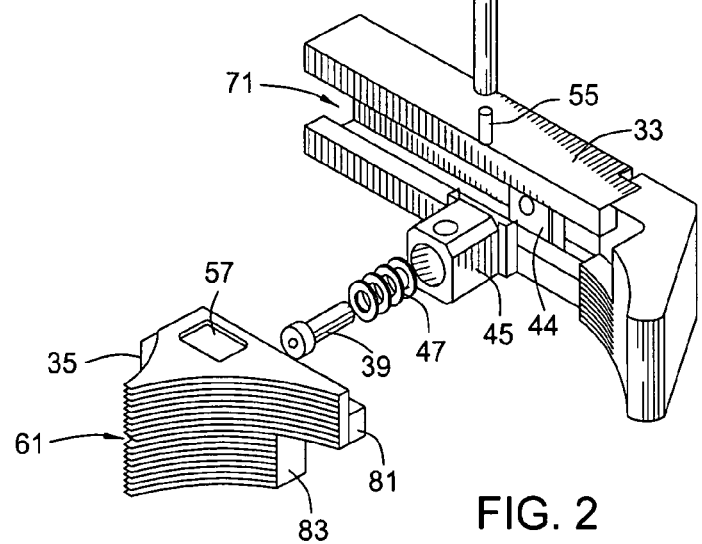
FIG. 2 is an exploded isometric view of one embodiment of a stacker bar assembly constructed in accordance with the present invention.
Figure 3:
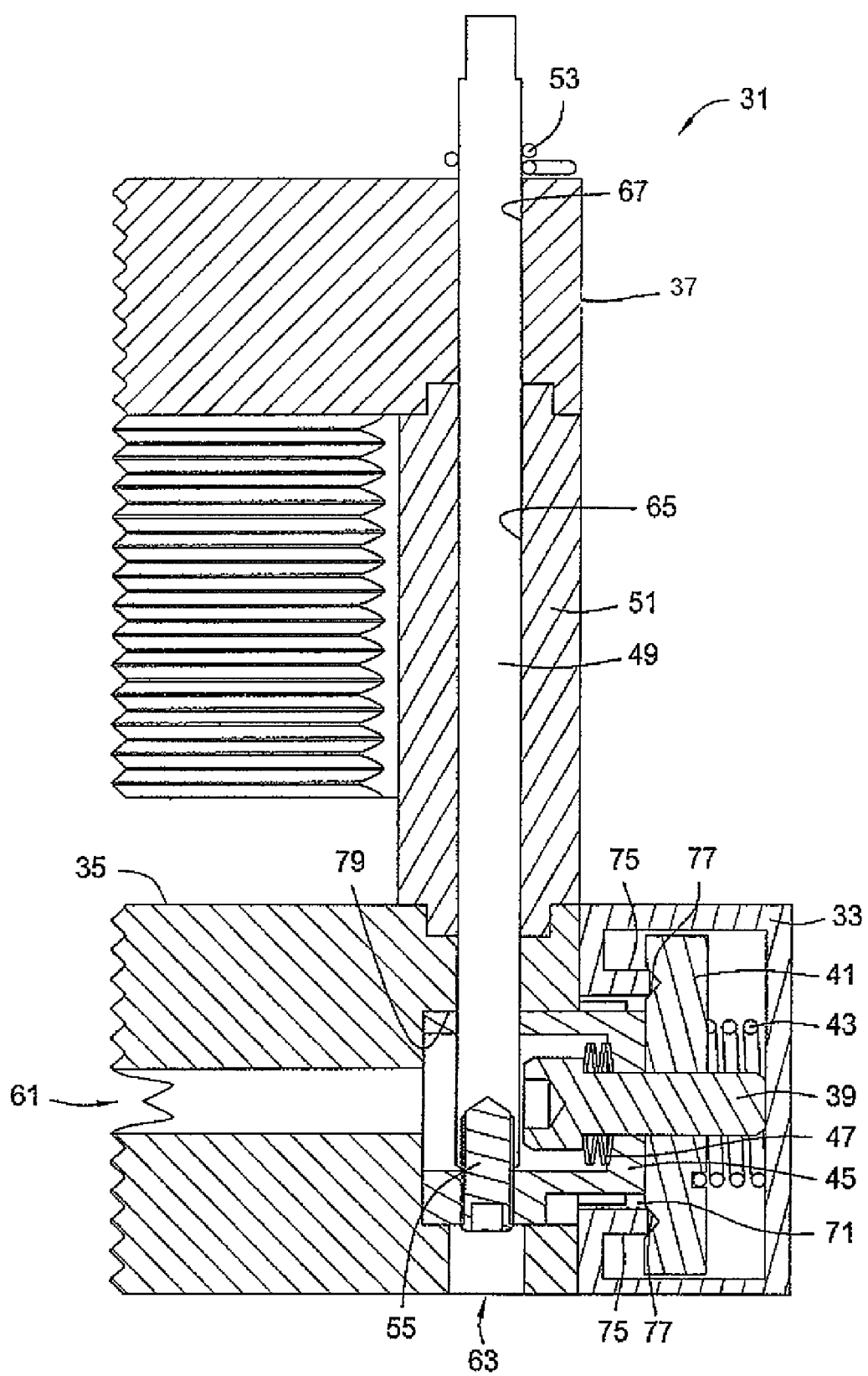
FIG. 3 is a sectional side view of the stacker bar assembly of FIG. 2.

Referring now to FIGS. 2 and 3, one embodiment of a stacker bar assembly 31 constructed in accordance with the present invention is shown. The stacker bar assembly 31 comprises a support member or "push bar" 33, a plurality of glass-contacting lower pads or inserts 35, a plurality of upper pads 37, and means for slidably attaching the pads 35, 37 to the push bar 33. In one embodiment, the means for attaching includes bolts 39, nuts 41, spring retainers 43 between the nuts 41 and push bar 33, a bushing 45, and a spring 47 between bushing 45 and bolt 39. In addition, a pin 49 extends through (e.g., vertically) pads 35, 37, bushing 45, and an optional spacer 51. A spring clip 53 and screw 55 are located on opposite ends of vertical pin 49 for retention thereof.

In the embodiment shown, the lower pads 35 are mounted to the push bar 33 for contacting and pushing respective lower portions of the glass articles 11 (FIG. 1) into the annealing furnace. Each of the lower pads 35 utilizes one bushing 45 to secure itself to the push bar 33 with one bolt 39. The pin 49 extends through the bushing 45 to secure a respective one of the lower pads 35 thereto. As an improvement over the prior art, the lower pads 35 are independently mounted to the push bar 33 relative to each other and independently removable from the bushings 45 via the pins 49 without unbolting the bushings 45 from the push bar 33.

The bushings 45 fit in an opening 79 in lower pads 35 and are shaped and dimensioned to interface with slot 71 of push bar 33 to provide rotational rigidity and support in addition to the support provided through attachment thereto. In addition, washers, spacers, lock washers, and additional springs may also be included in the attaching means. Still other alternative repositionable attaching means are also possible, including clamps, spring clips, and magnetic couplings.

Figure 4:
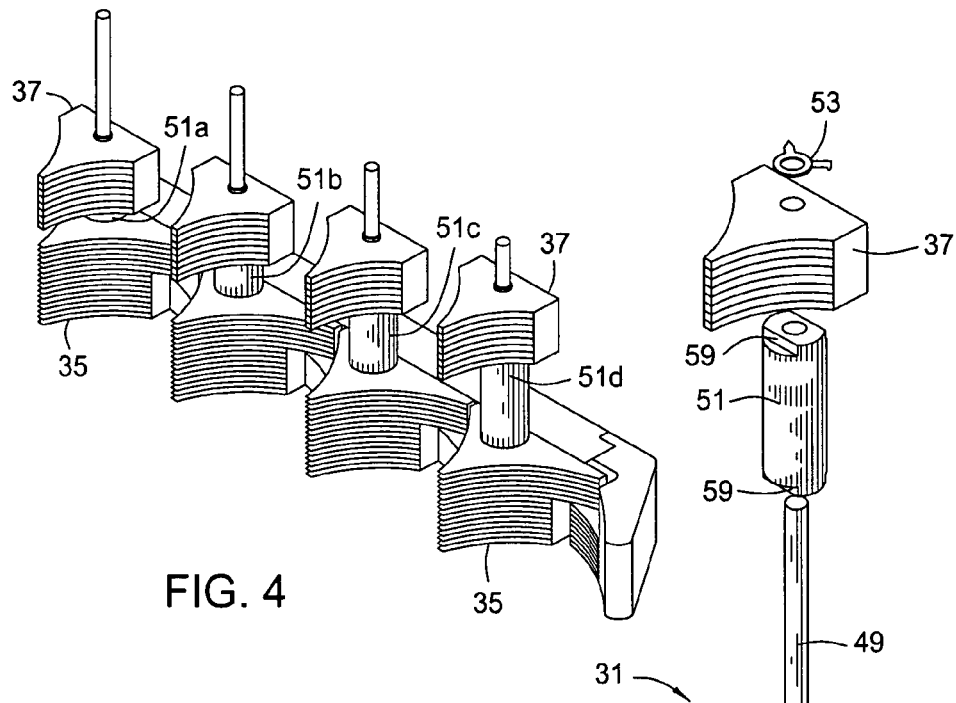
FIG. 4 is an isometric view of the stacker bar assembly of FIG. 2 illustrating various vertical adjustments thereof.

The upper pads 37 are provided for contacting and pushing respective upper portions of the glass articles 11 into the annealing furnace 17. The upper pads 37 are vertically spaced apart from respective ones of the lower pads 35 on the pins 49. In one embodiment, each lower pad 35 and a respective upper pad 37 form a pair of pads 35, 37, such that each lower pad 35 is vertically separated from a respective upper pad 37 by the spacer 51. As shown in FIG. 4, a plurality of spacers 51a-d having different vertical heights may be used to accommodate glass articles of different vertical dimensions.

The upper pads 37 are prevented from rotating relative to respective ones of the lower pads 35 by, for example, keyed features 57 formed thereon, which engage keyed features 59 on spacer 51. Each of the pins 49 is secured to a respective one of the bushings 45 with a screw 55 (e.g., a set screw) and a spring clip 53 secures a respective one of the upper pads 37 to the pin 49. In one embodiment, the pin 49 is smooth and extends through smooth bores 63, 65, 67 in lower pad 35, spacer 51 and upper pad 37, respectively.

The longitudinal positions of respective pairs of the lower and upper pads 35, 37 relative to the push bar 33 are slidably adjusted by relocating the bushings 45 relative to the push bar 33. The slot 71 has an x-axis that is generally perpendicular to the pushing or y-direction. The slot 71 allows the pads 35, 37 to be slidably translated along the x-axis and repositioned to contact hot glass articles having different shapes and sizes. Repositioning allows different center-to-center spacing and contact angles for similarly sized hot glass articles as well as handling different diameter articles. Each lower pad 35 has an aperture 61 for providing torquing access to a respective one of the bolts 39, and thereby adjusting the longitudinal position thereof. The aperture 61 has a diameter that is smaller than a diameter of the bolt 39.

In one embodiment, the push bar 33 comprises a channel having a slot 71 through which the bushings 45 extend. A nut 41 attaches each respective pair of the bushings 45 and bolts 39 to the push bar 33, and a spring 43 between the nut 41 and an interior of the channel biases the nut 41 toward the slot 71. Another spring 73 is located between each pair of the bolts 39 and bushings 45 for biasing respective ones of the bolts 39 away from the nuts 41. The channel has longitudinal flanges 75 that extend inward from the slot 71. In addition, each nut 41 has longitudinal notches 77 for receiving the flanges 75 such that the flanges 75 seat in the notches 77.

Unlike the "tongue-and-groove" design described in U.S. Pat. No. 5,741,343, the side edges 81, 83 on each lower pad 35 do not overlap. Rather, as shown in FIG. 4, they are formed at orthogonal angles to permit individual removal of the lower pads 35 from the overall assembly. The side edges 81, 83 on both longitudinal sides of each lower pad 35 are complementary to and engage the side edges 81, 83 on both of the lower pads 35 adjacent thereto.

Although manual means may be used to reposition the pads 35, 37 (e.g., manual loosening of bolts, sliding pads, and tightening of bolts), other nonmanual means for repositioning are also possible. These other repositioning means include hydraulic actuators, pneumatic positioners, and remotely operated mechanical levers.

The adjoining glass-contacting surfaces of the pads 35, 37 interact to form a mosaic or multi-element surface for contacting the hot glass articles. The multi-element surface forms glassware pockets that contact a plurality of hot glass articles as they are pushed into the annealing furnace with minimal thermal and mechanical damage. Since all of the pads 35, 37 are repositionable and in slidable contact with the push bar 33, the multi-element surface for contacting can also be continuously adjustable to handle various shapes and sizes of hot glass articles.

Figure 5:
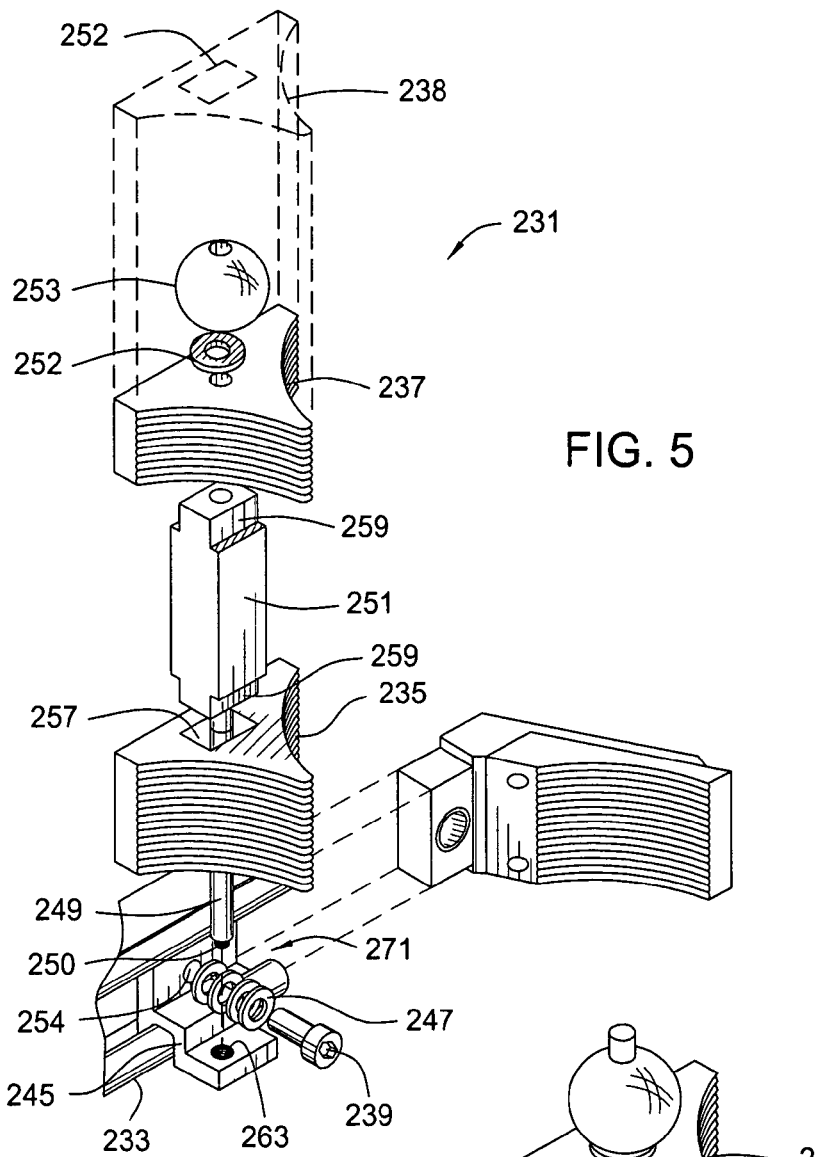
FIG. 5 is an exploded isometric view of another embodiment of a stacker bar assembly constructed in accordance with the present invention.
Figure 6:
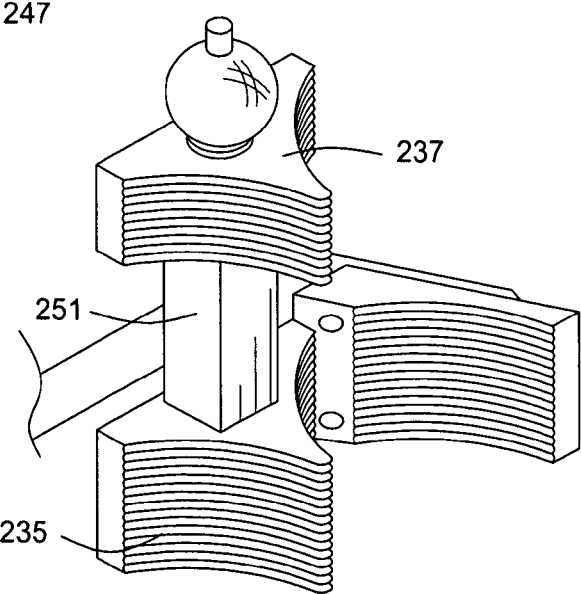
FIG. 6 is a sectional side view of the stacker bar assembly of FIG. 5.
Figure 7:
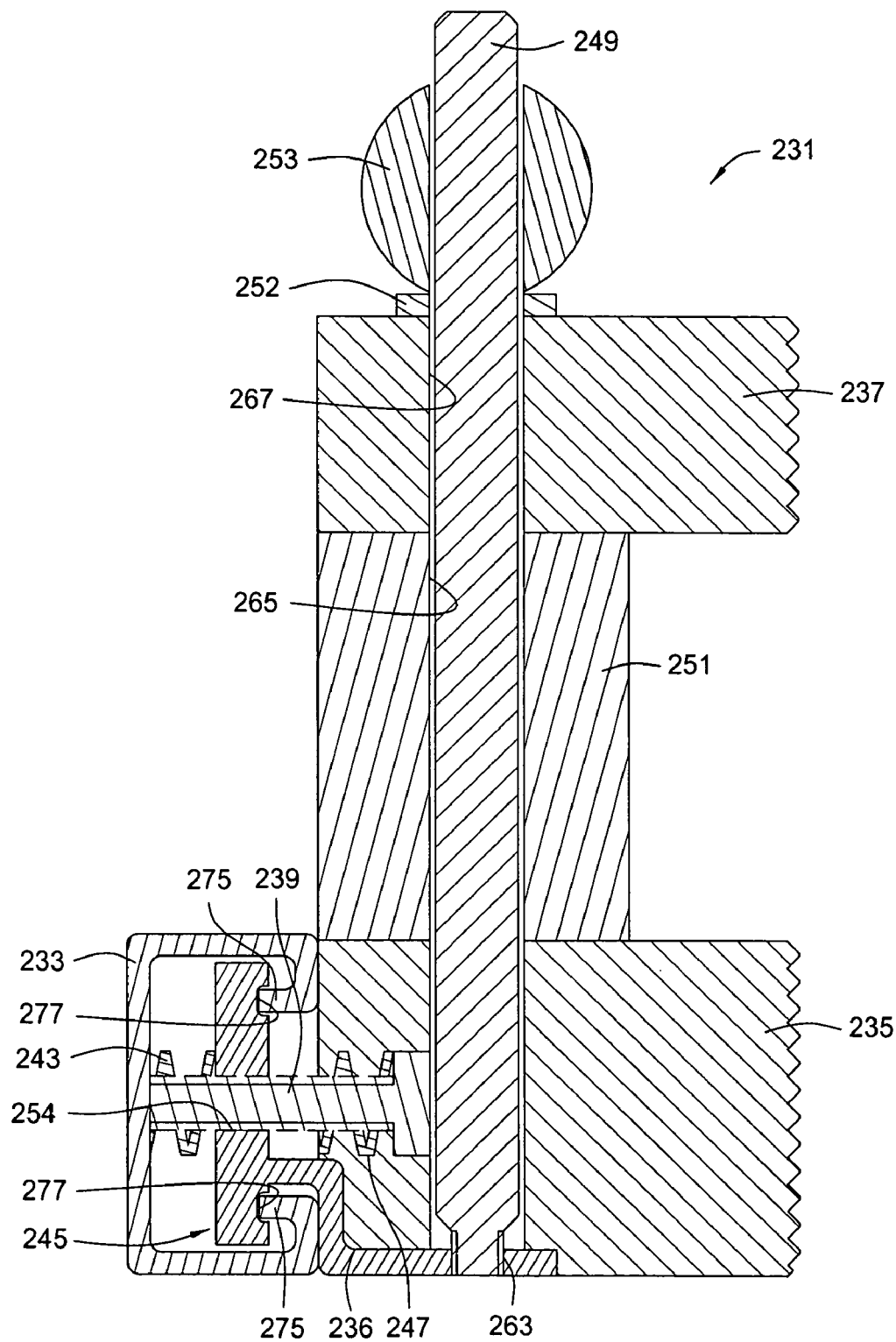
FIG. 7 is an isometric view of the stacker bar assembly of FIG. 5 illustrating various vertical adjustments thereof.

Referring now to FIGS. 5-7, another embodiment of the invention is shown. Like the preceding embodiment, this embodiment of the stacker bar assembly 231 comprises a push bar 233 and a plurality of lower pads 235 mounted to the push bar 233. The lower pads 235 and upper pads 237 (e.g., their concave surfaces) contact and push respective lower and upper portions of glass articles into an annealing furnace. The upper pads 237 may be vertically spaced apart from respective ones of the lower pads 235.

Each of the lower pads 235 has a bracket 245 that is secured directly to the push bar 233 with a bolt 239. A pin 249 is mounted to each bracket 245 to secure a respective one of the lower pads 235 thereto. The lower pads 235 are independently mounted to the push bar 233 relative to each other and independently removable from the brackets 245 via the pins 249 without unbolting the brackets 245 from the push bar 233.

The lower pads 235 may be vertically separated from the upper pads 237 by spacers 251 that are free of contact with the push bar 233. As described above, the spacers 251 may have different vertical heights to accommodate glass articles of different vertical dimensions. The upper pads 237 are prevented from rotating relative to the lower pads 235 and spacers 251 via keyed features 259 (FIG. 5). The lower and upper pads 235, 237 have horizontal cross-sectional areas that define perimeters 238. A horizontal cross-sectional area 252 of the spacers 251 is located completely within the perimeters 238.

In one embodiment, lower ends 250 of the pins 249 threadingly engage threaded holes 263 in the brackets 245. Weights (see, e.g., spheres 253) secure the upper pads 237 to the pins 249. The lower pads 235 have reliefs 236 on lower and rear surfaces thereof that are complementary in shape to the brackets 245.

The longitudinal positions of the lower and upper pads 235, 237, relative to the push bar 233, are adjusted by relocating the brackets 245 relative to the push bar 233. In one embodiment, the push bar 233 comprises a channel having a slot 271 through which the brackets 245 extend. The bolts 239 threadingly engage threaded holes 254 in the brackets 245 to push the brackets 245 against an interior (e.g., flanges 275) of the push bar 233. Springs 243 are located between push bar 233 and brackets 245 on bolts 239 to bias brackets 245 against push bar 233. Different springs 247 are located between the heads of the bolts 239 and the brackets 245 to bias the bolts 239 away from the brackets 245. The longitudinal flanges 275 of push bar 233 extend inward from the slot 271. The brackets 245 have longitudinal notches 277 for receiving at least one of the flanges 275 such that said at least one of the flanges 275 seats in one of the notches 277.

Figure 8:
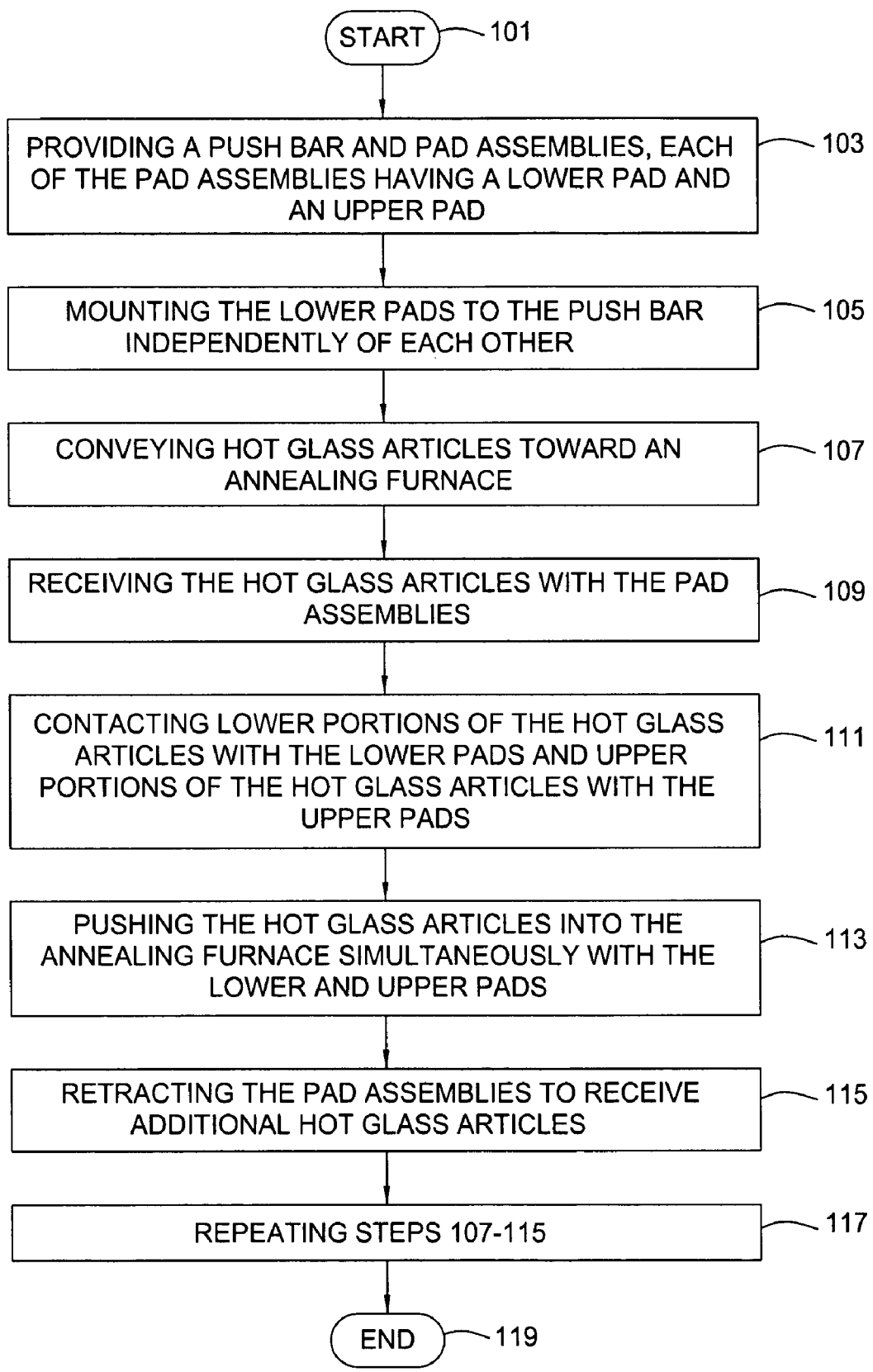
FIG. 8 is a high level flow diagram of one embodiment of a method constructed in accordance with the present invention.

Referring now to FIG. 8, one embodiment of a method of handling glass articles in a glass article fabrication operation is depicted. The method begins as indicated at step 101, and comprises providing a push bar and pad assemblies, each of the pad assemblies having a lower pad and an upper pad (step 103); mounting the lower pads to the push bar independently of each other (step 105); conveying hot glass articles toward an annealing furnace (step 107); receiving the hot glass articles with the pad assemblies (step 109); contacting lower portions of the hot glass articles with the lower pads and upper portions of the hot glass articles with the upper pads (step 111); pushing the hot glass articles into the annealing furnace simultaneously with the lower and upper pads (step 113); retracting the pad assemblies to receive additional hot glass articles (step 115); repeating steps 107 through 115, before ending as indicated at step 119.

The method may further comprise spacing apart the lower and upper pads in a vertical direction and contacting the hot glass articles with concave surfaces; and/or spacing apart respective pairs of the lower and upper pads with spacers, and configuring the spacers to be free of contact with the push bar. The method also may comprise providing each of the lower pads with a bushing that is secured to the push bar with a bolt, and securing the lower pads to the bushings with pins; and/or independently removing the lower pads from the bushings via the pins without unbolting the bushings from the push bar; and/or securing the pins to the bushings with screws, and securing the upper pads to the pins with spring clips; and/or adjusting longitudinal positions of respective pairs of the lower and upper pads relative to the push bar by relocating the bushings along the push bar; and/or torquing the bolts through apertures in the lower pads, the apertures having diameters that are smaller than diameters of heads of the bolts.

The pads are preferably composed of a ceramic material, more preferably a tough grade of graphite, which is normally substantially free of plastic or other nonmetallic resins or fibers. The contact surfaces of the pads are preferably arcuate in order to improve the glass article containment characteristics of the stacker bar assembly. Although a constant curvature across the thickness of the pads is preferred for substantially cylindrical hot glass articles such as typical bottles, alternative contact surface shapes are also possible. Alternative contact surface shapes may include planar surface portions (forming an adjustable and interacting saw tooth pattern when adjoining pads are secured to the support member) or more complex shapes to provide added contact surfaces for noncylindrical hot glass articles.

In one embodiment, the arcuate surfaces of the pads have a radius of curvature of about 2.25 inches. These surfaces, when combined with the adjustable pad location, allow a single stacker bar assembly to reliably push a plurality of cylindrical glass articles varying in diameter from about 1.875 to 4 inches. In another embodiment, cylindrical glass articles ranging in diameter from about 4 to 8 inches can be accommodated. The adjoining arcuate surfaces form glassware nesting pockets which are more forgiving of positional and pushing misalignments than saw tooth configurations.

In addition to the adjustable shape and materials of construction of the pads, serrating or controlling the surface finish of the contact surfaces may be varied to push and handle hot glass articles without damage. A surface roughness (of a planar or arcuate surface) of no smoother than about 125 to 250 µin, RMS, is typical. However, a smoother surface finish may also be tolerated for some applications. If an arcuate and serrated surface of a pad is used for contacting hot glass articles having a diameter of about 3 inches, the serrated surface is preferably formed by milling to create an average ridge to trough dimension in the range of about 0.050 to 0.060 inch. Other processes for producing a serrated and/or roughened surface include grinding, abrasion, and erosion. Serrated surfaces having an average ridge to trough dimension of at least about 0.001 inch or less may be used for other contact surface applications, but typically at least about 0.010 inch.

The serrated or other rough surface finish reduces the actual hot glass-graphite contact surface of the pad and thereby significantly improves stacker bar assembly performance by reduces the actual (microscopic) glass contacting area at contact sites and increasing the distribution of the actual contact areas at these sites when compared to smoother contact surfaces. The use of serrated or roughened surfaces on the pads of the invention is possible because the pads are substantially composed of a nonmetallic ceramic material. Unlike a serrated or rough stainless steel surface which may tend to increase mechanical damage to contacting hot glass articles when compared to a smoother stainless steel surface, the thermal and physical properties of a rough or serrated graphite or other ceramic surface seem to reduce thermal and mechanical damage when compared to smoother nonmetallic contact surfaces.

Although the contact pads are typically maintained at elevated temperatures by being located near the annealing oven, the temperature of the pads is typically less than the hot glass articles, and it is believed the smaller actual contacting area of a serrated or rough contact surface reduces heat transfer from the hot glass articles to the nonmetallic pads, thereby reducing checking or other thermal stress damage. Furthermore, the arcuate shape plus rough/serrated surface plus nonmetallic composition is believed to better distribute mechanical loads to reduce mechanical damage.

Although some alternative embodiments have been described, other alternative embodiments are also possible. These include: using porous or ported pads which may be combined with a fluid flow through the pads (e.g., similar to air table handling): using separate contact surfaces on the pad instead of a continuous (radius of curvature) contact surface across the thickness of the pad (e.g., a top and a bottom contact surfaces on the pads); adding a heating element for heating the pad to elevate the temperature of the pad and minimize heat transfer from the hot glass articles, especially if a fluid is flowing near the pads; and attaching the pad to other glass handling or other equipment. Moreover, the various features of the different embodiments are substantially interchangeable.

While the invention has been shown or described in only some of its forms, it should be apparent to those skilled in the art that it is not so limited, but is susceptible to various changes without departing from the scope of the invention.

What is claimed is:

1. A stacker bar assembly for glass article fabrication, comprising:

a push bar; and a plurality of pad assemblies mounted to the push bar for contacting and pushing a glass article into an annealing furnace; each pad assembly comprising:

a lower pad for contacting a lower portion of the glass article, the lower pad being removably mounted to the push bar, the lower pad having a top surface with a recess therein;

a spacer engaged with the recess in the top surface of the lower pad and extending upwardly therefrom; and an upper pad with a lower surface and a recess therein, the spacer engaged with the recess on the upper pad, the upper pad located vertically above the lower pad for contacting the glass article at a position above where the lower pad contacts the glass article, wherein the upper pad and spacer are slidably engageable with a pin extending upwardly from the lower pad whereby said upper pad and spacer may be removed by sliding said upper pad and spacer upwardly on the pin.

2. A stacker bar assembly for glass article fabrication, comprising:

a push bar; and a plurality of pad assemblies mounted to the push bar for contacting and pushing a glass article into an annealing furnace; each pad assembly comprising:

a lower pad for contacting a lower portion of the glass article, the lower pad being removably mounted to the push bar, the lower pad having a top surface with a recess therein;

a spacer engaged with the recess in the top surface of the lower pad and extending upwardly therefrom; and an upper pad with a lower surface and a recess therein, the spacer engaged with the recess on the upper pad, the upper pad located vertically above the lower pad for contacting the glass article at a position above where the lower pad contacts the glass article; and wherein the upper pad and spacer are slidably engageable with a pin extending upwardly from the lower pad whereby said upper pad and spacer may be removed by sliding said upper pad and spacer upwardly on the pin, a retaining member attachable to the pin comprising one of a weight that slidingly engaged with the pin and that bears on the upper pad and a spring clip that engages the pin;

wherein the upper pad and spacer are dissassembleable from the lower pad and whereby the upper pad may be removed and replaced with another upper pad without detaching the lower pad from the push bar.

3. A stacker bar assembly for glass article fabrication, comprising:

a push bar;

a plurality of pad assemblies mounted to the push bar for contacting and pushing a glass article into an annealing furnace; each pad assembly comprising:

a lower pad for contacting a lower portion of the glass article, the lower pad being removably mounted to the push bar, the lower pad having a top surface with a recess therein;

a spacer engaged with the recess in the top surface of the lower pad and extending upwardly therefrom;

an upper pad with a lower surface and a recess therein, the spacer engaged with the recess on the upper pad, the upper pad located vertically above the lower pad for contacting the glass article at a position above where the lower pad contacts the glass article, wherein the upper pad and spacer are dissassembleable from the lower pad whereby the upper pad may be removed and replaced with another upper pad without detaching the lower pad from the push bar;

wherein the lower pad has a bushing that is secured to the push bar with a bolt, and a pin extends vertically through the bushing to interconnect the pad assembly, and wherein the lower and upper pads have apertures through which the pin extends, and the apertures have non-uniform cross-sectional areas over a vertical length of each of the lower and upper pads.

\* \* \* \* \*

UNITED STATES PATENT AND TRADEMARK OFFICE
CERTIFICATE OF CORRECTION

| | | |
|---|---|---|
| PATENT NO. | : 7,765,833 B2 | |
| APPLICATION NO. | : 11/384713 | |
| DATED | : August 3, 2010 | |
| INVENTOR(S) | : Giuseppe Isalberti et al. | |

It is certified that error appears in the above-identified patent and that said Letters Patent is hereby corrected as shown below:

Col. 2, line 4, delete "gas" and insert --glass--

Col. 2, line 41, delete "This" and insert --These--

Col. 7, line 33, delete "reduces" and insert --reducing--

Signed and Sealed this
Twenty-fourth Day of May, 2011

David J. Kappos
*Director of the United States Patent and Trademark Office*